US007647301B2

(12) United States Patent
Nakano

(10) Patent No.: US 7,647,301 B2
(45) Date of Patent: Jan. 12, 2010

(54) INFORMATION PROVISION APPARATUS, FORMAT SEPARATION APPARATUS, INFORMATION PROVISION METHOD AND PROGRAM

(75) Inventor: Takashi Nakano, Hiroshima (JP)

(73) Assignee: Open-Circuit, Ltd., Hiroshima (JP)

( * ) Notice: Subject to any disclaimer, the term of this patent is extended or adjusted under 35 U.S.C. 154(b) by 274 days.

(21) Appl. No.: 10/902,857

(22) Filed: Aug. 2, 2004

(65) Prior Publication Data

US 2005/0033738 A1 Feb. 10, 2005

(30) Foreign Application Priority Data

Aug. 8, 2003 (JP) ............................ 2003-289625

(51) Int. Cl.
*G06F 17/30* (2006.01)

(52) U.S. Cl. .................. 707/3; 707/6; 707/7; 707/102; 707/104.1

(58) Field of Classification Search .................... 707/3, 707/104.1, 6, 7, 102
See application file for complete search history.

(56) References Cited

U.S. PATENT DOCUMENTS

| | | | | |
|---|---|---|---|---|
| 6,925,631 | B2 * | 8/2005 | Golden | 717/115 |
| 6,934,712 | B2 * | 8/2005 | Kiernan et al. | 707/102 |
| 6,934,740 | B1 * | 8/2005 | Lawande et al. | 709/213 |
| 6,938,079 | B1 * | 8/2005 | Anderson et al. | 709/222 |
| 6,941,521 | B2 * | 9/2005 | Lin et al. | 715/762 |
| 6,957,416 | B2 * | 10/2005 | Adams | 717/107 |
| 7,032,011 | B2 * | 4/2006 | Woodard et al. | 709/220 |
| 7,043,499 | B1 * | 5/2006 | Nelson et al. | 707/102 |
| 7,051,316 | B2 * | 5/2006 | Charisius et al. | 717/103 |
| 7,054,818 | B2 * | 5/2006 | Sharma et al. | 704/270 |
| 7,318,066 | B2 * | 1/2008 | Kaufman et al. | 707/102 |
| 7,480,910 | B1 * | 1/2009 | Kuwamoto et al. | 718/102 |
| 2001/0014895 | A1 * | 8/2001 | Sappal | 707/500 |
| 2002/0104070 | A1 * | 8/2002 | Adams | 717/108 |
| 2003/0037069 | A1 * | 2/2003 | Davison | 707/200 |
| 2003/0149697 | A1 * | 8/2003 | Pasquali | 707/10 |
| 2003/0167446 | A1 * | 9/2003 | Thomas | 715/513 |
| 2003/0184585 | A1 * | 10/2003 | Lin et al. | 345/763 |
| 2004/0019611 | A1 * | 1/2004 | Pearse et al. | 707/104.1 |

FOREIGN PATENT DOCUMENTS

| | | |
|---|---|---|
| JP | 05-233565 | 9/1993 |
| JP | 10-269072 | 10/1998 |
| JP | 2000-123023 | 4/2000 |
| JP | 2001-325299 | 11/2001 |

* cited by examiner

*Primary Examiner*—Don Wong
*Assistant Examiner*—Thanh-Ha Dang
(74) *Attorney, Agent, or Firm*—Ronald E. Greigg

(57) ABSTRACT

An information-provision apparatus that is capable of easily changing the format of display data without the risk due to changes of the program since it is not necessary to change the program. A format-separation unit separates basic format data, to which part information is attached that indicates a starting position and ending position of each structural unit of the format, according to the part information, and stores the format of a format database in a format-memory unit. Next, a format-acquisition unit receives search conditions from an information terminal, and acquires each of the structural units corresponding to those search conditions from the format-memory unit. A display-data-generation unit inputs the data from the search results acquired from the database into the variables of the structural units acquired by the format-acquisition unit and generates display data, and a send unit sends the generated display data to the information terminal.

12 Claims, 14 Drawing Sheets

```
402 <!-- Part:1 -->
<!DOCTYPE HTML PUBLIC "-//W3C//DTD HTML 4.01 Transitional//EN">
<html>
<head>
<META http-equiv="Content-Type" content="text/html; charset=EUC-JP">
<META name="GENERATOR" content="Homepage Maker">
<META http-equiv="Content-Style-Type" content="text/css">
<title>List </title>
403 <!-- Part:1 -->
404 <!-- Part:1 -->
</head>
<body onLoad="setjyouken()">
405 <!-- Part:1-->
406 <!-- Part:2 -->
 <FORM name="search" METHOD="post" ACTION="/database/cgi/search.cgi">
<TABLE width=100% cellPadding=0 cellSpacing=0>
 <TBODY>
  <TR>
   <TD vAlign=center>
    <table width="100%" border="0" cellpadding="0" cellspacing="1" bgcolor="#dedede">
     <tr>
      <td width="10%" nowrap bgcolor="#eeeeee"> <div align="center"><font color="#666666">Price
</font></div></td>
***Middle is omitted ***
 </td>
     </tr>
    </table>
    <div align="center"><br>
    </div><INPUT TYPE="submit" name="submit" VALUE="Next "></TD>
  </TR>
 </TBODY>
</TABLE>
407 <!-- Part:2 -->
408 <!-- Part:3 -->
 <TR>
   <TD>%%SYUMOKU%%★</TD>
   <TD><a href="%%SYOUSAILINK%%"><b>NO.%%DAT1%%★</b></a></TD>
   <TD><a href="%%SAKUJYOLINK%%">Delete </a> <a href="%%HENSYUULINK%%">Edit </a></TD>
  </TR>
  <TR>
   <TD>%%DAT3%%★</TD>
   <TD><FONT color=#990000><strong>%%DAT4%% million yen ★</strong></FONT></TD>
   <TD>%%SETSUBI%%★</TD>
  </TR>
  <TR>
   <TD colspan="4">
   <TABLE cellspacing="0" cellpadding="0" width="100%" border="0" height="1">
    <TBODY>
     <TR>
      <TD bgcolor="#000000"></TD>
     </TR>
    </TBODY>
   </TABLE>
   </TD>
  </TR>
409 <!-- Part:3 -->
410 <!-- Part:1 -->
</body>
</html>
411 <!-- Part:1 -->
```

Figure 5:
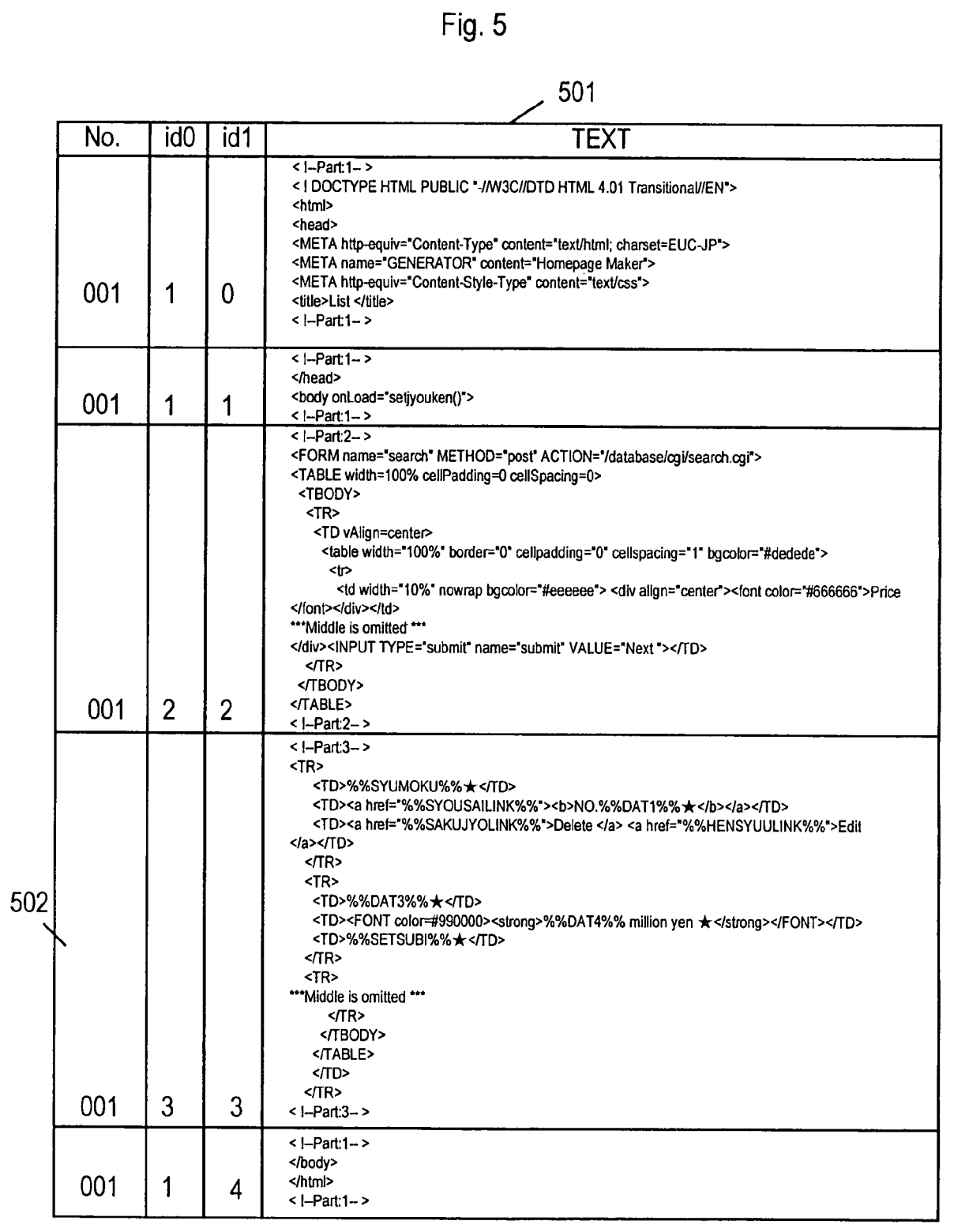

| No. | id0 | id1 | TEXT |
|---|---|---|---|
| 001 | 1 | 0 | < !–Part:1– ><br>< ! DOCTYPE HTML PUBLIC "-//W3C//DTD HTML 4.01 Transitional//EN"><br><html><br><head><br><META http-equiv="Content-Type" content="text/html; charset=EUC-JP"><br><META name="GENERATOR" content="Homepage Maker"><br><META http-equiv="Content-Style-Type" content="text/css"><br><title>List </title><br>< !–Part:1– > |
| 001 | 1 | 1 | < !–Part:1– ><br></head><br><body onLoad="setjyouken()"><br>< !–Part:1– > |
| 001 | 2 | 2 | < !–Part:2– ><br><FORM name="search" METHOD="post" ACTION="/database/cgi/search.cgi"><br><TABLE width=100% cellPadding=0 cellSpacing=0><br><TBODY><br><TR><br><TD vAlign=center><br><table width="100%" border="0" cellpadding="0" cellspacing="1" bgcolor="#dedede"><br><tr><br><td width="10%" nowrap bgcolor="#eeeeee"> <div align="center"><font color="#666666">Price<br></font></div></td><br>***Middle is omitted ***<br></div><INPUT TYPE="submit" name="submit" VALUE="Next "></TD><br></TR><br></TBODY><br></TABLE><br>< !–Part:2– > |
| 001 | 3 | 3 | < !–Part:3– ><br><TR><br><TD>%%SYUMOKU%%★</TD><br><TD><a href="%%SYOUSAILINK%%"><b>NO.%%DAT1%%★</b></a></TD><br><TD><a href="%%SAKUJYOLINK%%">Delete </a> <a href="%%HENSYUULINK%%">Edit<br></a></TD><br></TR><br><TR><br><TD>%%DAT3%%★</TD><br><TD><FONT color=#990000><strong>%%DAT4%% million yen ★</strong></FONT></TD><br><TD>%%SETSUBI%%★</TD><br></TR><br><TR><br>***Middle is omitted ***<br></TR><br></TBODY><br></TABLE><br></TD><br></TR><br>< !–Part:3– > |
| 001 | 1 | 4 | < !–Part:1– ><br></body><br></html><br>< !–Part:1– > |

502

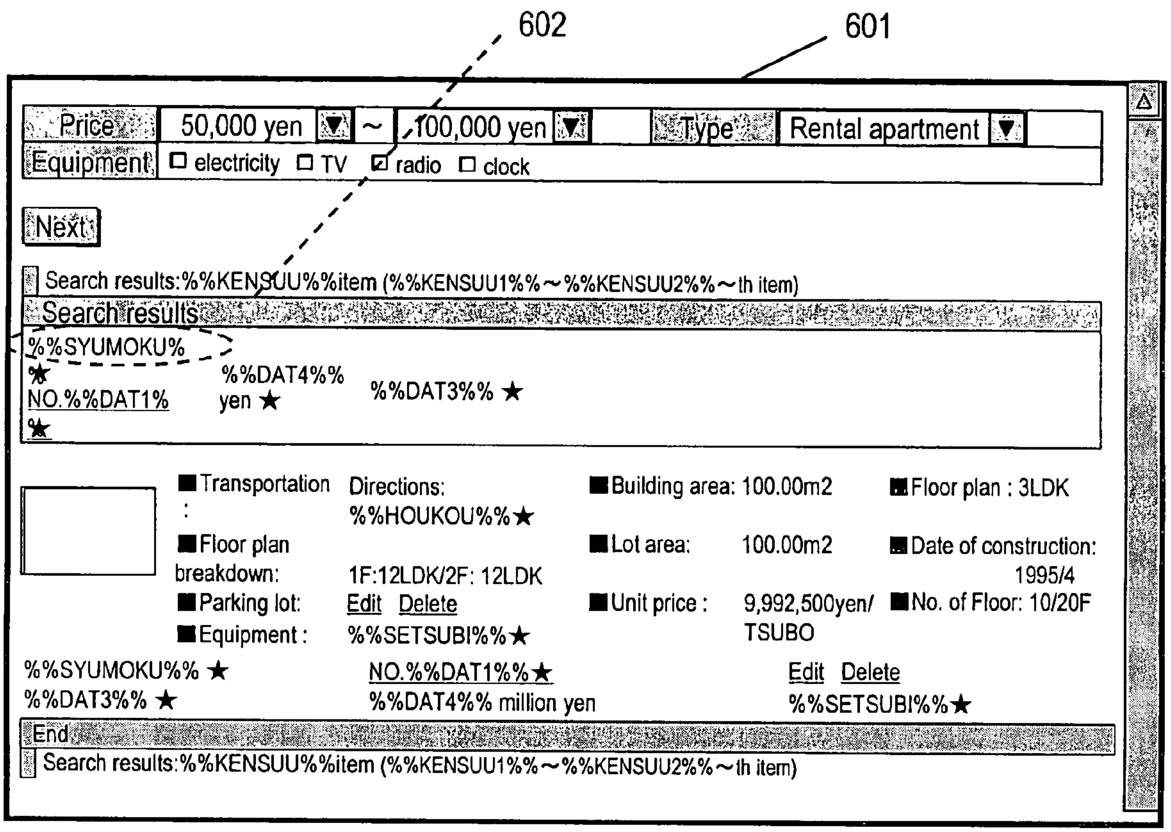

Fig. 6

```
                                                602              601
┌─────────────────────────────────────────────────────────────────────────┐
│ Price   50,000 yen ▼ ~ 100,000 yen ▼    Type   Rental apartment ▼       │
│ Equipment  ☐ electricity  ☐ TV  ☑ radio  ☐ clock                        │
│ Next                                                                     │
│ Search results:%%KENSUU%%item (%%KENSUU1%%~%%KENSUU2%%~th item)          │
│ Search results                                                           │
│ %%SYUMOKU%%                                                              │
│ ★         %%DAT4%%                                                       │
│ NO.%%DAT1%   yen ★      %%DAT3%% ★                                       │
│ ★                                                                        │
│                                                                          │
│          ■Transportation  Directions:    ■Building area: 100.00m2   ■Floor plan : 3LDK │
│          :                %%HOUKOU%%★                                    │
│          ■Floor plan                     ■Lot area:     100.00m2    ■Date of construction: │
│          breakdown:       1F:12LDK/2F: 12LDK                                    1995/4 │
│          ■Parking lot:    Edit  Delete   ■Unit price :  9,992,500yen/ ■No. of Floor: 10/20F │
│          ■Equipment :     %%SETSUBI%%★                  TSUBO            │
│ %%SYUMOKU%% ★             NO.%%DAT1%%★                     Edit  Delete  │
│ %%DAT3%% ★                %%DAT4%% million yen             %%SETSUBI%%★  │
│ End                                                                      │
│ Search results:%%KENSUU%%item (%%KENSUU1%%~%%KENSUU2%%~th item)          │
└─────────────────────────────────────────────────────────────────────────┘
```

| No. | id0 | id1 | TEXT |
| --- | --- | --- | --- |
| 003 | 1 | 0 | <!--Part:1 #ALLOW=YAMADA,192.168.24.36,00-99-26-69-5B-A4# --><br><!DOCTYPE HTML PUBLIC "-//W3C//DTD HTML 4.01 Transitional//EN"><br><html><br><head><br><META http-equiv="Content-Type" content="text/html; charset=EUC-JP"><br><META name="GENERATOR" content="Homepage Maker"><br><META http-equiv="Content-Style-Type" content="text/css"><br><title>List </title><br><!--Part:1--> |
| 004 | 2 | 0 | <!--Part:2 #INCLUDE=001:3:3# --><br><!--Part:2--> |

1105

Fig.13 Prior Art search.cgi

1300

1301

1302

```
print("<!DOCTYPE HTML PUBLIC ¥"-//W3C//DTD HTML 4.01 Transitional
print("<html>¥n");
print("<head>¥n");
print("<META http-equiv=¥"Content-Type¥" content=¥"text/html; charset
print("<META name=¥"GENERATOR¥" content=¥" Homepage Maker ¥">¥n");
print("<META http-equiv=¥"Content-Style-Type¥" content=¥"text/css¥">¥n");
print("<title>List </title>¥n");
********
Middle omitted
********
print("</head>");
print("<body onLoad=¥"setjyouken()¥">¥n");
print("<TABLE width=100% cellPadding=0 cellSpacing=0>¥n");
print(" <TBODY>¥n");
print("  <TR>¥n");
print("   <TD vAlign=center>¥n");
print("    <table width=¥"100%¥" border=¥"0¥"
print("     <tr>¥n");
print("      <td width=¥"10%¥" nowrap bgcolor=¥"#eeeeee¥"> <div align=¥"
print("      <td bgcolor=¥"#fafaf0¥"><font size=¥"-1¥">¥n");
print("       <SELECT class=f10 name=kakaku0>¥n");
print("        <option value=¥"¥">No lower limit </option>¥n");
print("        <option value=¥"5¥" selected>50,000 yen </option>¥n");
print("    <SMALL> (<B>$kensuu1</B>～<B>$kensuu2</B>~th item )</SMALL>
print("   <TD width=¥"50%¥"></TD>¥n");
print("  </TR>¥n");
print(" </TBODY>¥n");
print("</TABLE>¥n");
print("</FORM>¥n");
print("</body>¥n");
print("</html>¥n");
```

INFORMATION PROVISION APPARATUS, FORMAT SEPARATION APPARATUS, INFORMATION PROVISION METHOD AND PROGRAM

BACKGROUND OF THE INVENTION

1. Field of the Invention

This invention relates to an information-provision apparatus, and more particularly to an information-provision apparatus that references a database according to a request from an information terminal and sends the data corresponding to the request to the information terminal.

2. Description of the Related Art

In recent years, the amount of information on the Internet is rapidly increasing, and methods of providing information linked to a database are becoming common. Providing information linked to a database could be performed as described below. That is, when a user uses a personal computer 1202 as shown in FIG. 12 to search for information corresponding to specified search conditions, the user accesses an information-provision server 1201 via the Internet 1203. At this time, the user notifies the information-provision server 1201 of the search conditions by entering keywords as search conditions into a specified form that is provided by the information-provision server 1201.

A send/receive unit 1207 in the information-provision server 1201 receives the search conditions and sends them to the search unit 1205. Here, the search unit 1205 is provided by a program that is executed by the CPU (central processing unit) of the information-provision server 1201, and the work memory 1206 (to be described later) corresponds to RAM (Random Access Memory) that is controlled by that program. Also, normally, this program is provided by a CGI (Common Gateway Interface), and in this example, it is shown in FIG. 13 as search.cgi 1300. The search conditions are given as arguments to search.cgi 1300.

After the search unit 1205 receives the search conditions, it acquires data corresponding to the search conditions from the database 1204, and stores that data temporarily in the work memory 1206. Next, the search unit 1205 enters the corresponding data into the variables of the search.cgi 1300, and at a print command, outputs the data as an html (HyperText Markup Language) file one line at a time. In other words, the output contents 1302 of the print command 1301 shown in FIG. 13 are in a format that contains variables, and by entering the data corresponding to the variables, data in html format containing that acquired data is created, and sent as display data. The portion of the output contents 1302 other than the variables becomes the basis of the display data, and that portion sets the format, or in other words, design of the display data in a browser. An example of the display data is shown in FIG. 14, and it can be seen that specified text is stored in the variable portion of the output contents 1302 to form the display data (searchresult.html) 1401.

Through the operation described above, display data having html format and containing data corresponding to the search conditions is created each time and sent to the personal computer 1202. In this way it is possible for the personal computer 1202 to reference data matching the search conditions in a specified format.

In the operation described above, the format is given in the program provided as the search unit, so in the example above when changing the format of the display data, it becomes necessary to rewrite the search.cgi itself.

However, in order to perform the rewriting, knowledge of rules for giving the design of the display data in html format is necessary. Also, in addition, knowledge of programming is necessary, so there is a problem in that it is not easy for anyone to change the format.

Moreover, in the case in which a plurality of formats is needed, a plurality of programs is also necessary, or it is necessary to perform steps corresponding to a plurality of programs in one program, and thus there is a problem in that the program itself becomes large.

Furthermore, bugs may exist in the program, and in the case in which those bugs apply a load to the server, the reliability of the system itself decreases, so simply executing a program that has been rewritten by the user and of which the proper operation cannot be assured must be avoided.

Also, in order to rewrite and register the program, a very high level of control authority of the information-provision server is necessary, however giving this kind of authority to the user can be said to be a source of trouble.

SUMMARY OF THE INVENTION

Based on the problems described above of the prior art, the object of the present invention is to provide an information-provision apparatus that is capable of easily changing the format of the display data without the risk due to changes of the program since there is no need to change the program.

The invention employs the following means in order to accomplish the object mentioned above. In other words, this invention is an information-provision apparatus that acquires data from a database according to a request from an information terminal, and correlates that data with a specified format to create display data, after which it sends that display data to the information terminal.

Here, a format-separation unit separates basic format data, to which part information is attached that indicates the starting position and ending position of each structural unit of the format, into structural units, and stores a format database in a format-memory unit.

Next, a format-acquisition unit receives search conditions from an information terminal and acquires the structural units from the format-memory unit that correspond to the search. A display-data-generation unit inputs the data from the search results acquired from the database into the variables of the structural units acquired by the format-acquisition unit and generates display data. The generated display data is sent to the information terminal by a sending unit.

The format-separation unit separates, analyzes and registers the format in this way based on the part information attached to basic format data, so by understanding the definition of the part information that is attached as a comment, it is possible even for a user that does not understand the program to easily register the basic format data. Also, by acquiring a specified format from the format database and inputting data as necessary into the variables, and setting the correspondence between the variables and the data acquired from the database, it is not necessary to change the processing contents, or in other words, program of the display-data-generation unit after that. Moreover, the program that generates display data can be constructed such that it just links text and inputs data into variables, so with its simple construction it can be applied to various formats, and the program does not need to become large. In addition, since the program is not changed, it is possible to prevent unforeseeable errors in operation of the program, and as a result the reliability of the system is improved. Furthermore, by having authority to use the format-separation apparatus, the user is able to easily register formats, so there is no need to have high-level authority for changing the program as in the past, and as a result, the reliability of the system is improved.

Also, the format-separation unit is constructed such that it also stores the type of structural unit that is contained in the part information and that corresponds to the part information in the format-memory unit. Moreover, the display-data-generation unit can be constructed such that it determines the type of the structural units, and correlates the data acquired from the database with the structural units and generates display data only for a specified type.

With this construction, by simply determining the types of the structural units, the display-data-generation unit is able to determine the existence of variables into which data is to be input, so there is no need to analyze whether or not there are variables in the structural units. In other words, since there is no need to analyze the contents of the structural units, it is possible to very quickly complete the process of inputting data.

Also, there is an item-number-judgment unit that determines the number of items of data that were acquired from the database according to a request from an information terminal, and selects the structural units to use based on that number of items, and the format-acquisition unit acquires the structural units that were set by the item-number-judgment unit.

The item-number-judgment unit can be such that it selects different structural units when the number of acquired items is greater than one and less than a specified number, and when the number of items is greater than a specified number.

With this construction, by dynamically changing the structural units to be acquired based on the number of items of data acquired, it is possible to provide the user with an easy-to-view display case-by-case according to the number of items of data. In this invention, the format can be registered for each structural unit, so even in the case of switching among a plurality formats, it is not necessary to prepare the display-data-generation unit, or in other words, the program for each format, and thus this is very effective.

Moreover, it is possible to have a load-judgment unit that determines the load on the CPU of the information-provision apparatus or determines the load on the network to which the information-provision apparatus is connected, and selects the structural units to use based on the load, and the format-acquisition unit acquires the structural units that were set by the load-judgment unit.

With this construction, by dynamically changing the format based on the load on the CPU or network, it is possible to avoid using a high-load format when there is high load, and thus it is possible to prevent a drop in system performance.

Moreover, the information-provision apparatus of this invention can be constructed such that together with comprising a sending unit that sends data for input to the information terminal for selecting structural units and/or the order of displaying the structural units, the format-acquisition unit acquires the structural units from the format-memory unit based on the selection results for that data for input.

With this construction, by having the format-acquisition unit acquire structural units based on the design selected by the user, it is possible to easily acquire display data having different display contents. By doing so, it is not necessary to have a plurality of programs or to have a complicated program.

Furthermore, construction can be such that the format-acquisition unit acquires specified structural units from the format-memory unit based on information that is obtained through communication with the information terminal, and the information can be verification information of the user using the information terminal.

In this case, it is possible to dynamically and easily change the design of the display data without instructions from the user.

Also, construction can be such that the format-separation unit separates the commands, which are contained in the part information and that are executed when using the structural units that are contained in that part information, and stores them in the format-memory unit. Moreover, a command-execution unit can be constructed such that when a command is contained in a structural unit acquired by the format-acquisition unit, it executes that command when using that structural unit.

As an example of the command is a command that restricts the conditions when using the structural units and includes the condition information of the restriction conditions. In this case, a use-condition-judgment unit (one example of a command-execution unit) determines whether or not it is allowed to use a structural unit based on the condition information, information related to the information terminal (IP address, MAC address, etc.) or information about the user that uses the information terminal (user ID, user name, etc.). Also, the display-data-generation unit generates display data based on the judgment results from the use-condition-judgment unit.

By doing so it is possible to restrict use for each structural unit. As a result, it is possible to maintain the required security and keep registration of structural units to a minimum. Also, since it is possible to restrict use by simply listing the restrictions in the basic format data, it is possible for a user that registers a format to easily restrict use of structural units without having to perform processing such as application and registration.

Moreover, as another example of a command is a command that indicates that another structural unit is to be inserted when using a structural unit. The command-execution unit acquires the other structural unit from the format-memory unit based on the command that the structural unit is to be inserted, and inserts the structural unit in the appropriate location.

By doing so, it is possible for a user registering a format to easily reuse structural units that are already registered.

Here, the information-provision apparatus and format-separation apparatus can be embodied using a computer. In that case, each of the units described above are embodiment by operating a program on the computer.

BRIEF DESCRIPTION OF THE DRAWINGS

FIG. 4 is an image drawing of the basic format data.

FIG. 5 is an image drawing of when the basic format data is stored in the format database.

FIG. 6 is an image drawing of when the basic format data is displayed by the browser.

FIG. 11 is an example of a format database that contains commands in the part information.

FIG. 13 is an example of a program used when creating a conventional display data.

DESCRIPTION OF THE PREFERRED EMBODIMENTS

To provide a better understanding of the invention, the preferred embodiments of the present invention will be explained with reference to the supplied drawings. The embodiments described below are detailed examples of the invention and do not limit the technical scope of the invention. Also, in the embodiments described below, examples are explained of using CGI for the search unit and HTML for the display data, however, the program language is not particularly limited, and the display data should just be based on the ML (Markup Language).

Embodiment 1

The information-provision apparatus of a first embodiment of the invention will be explained below.

Figure 1:
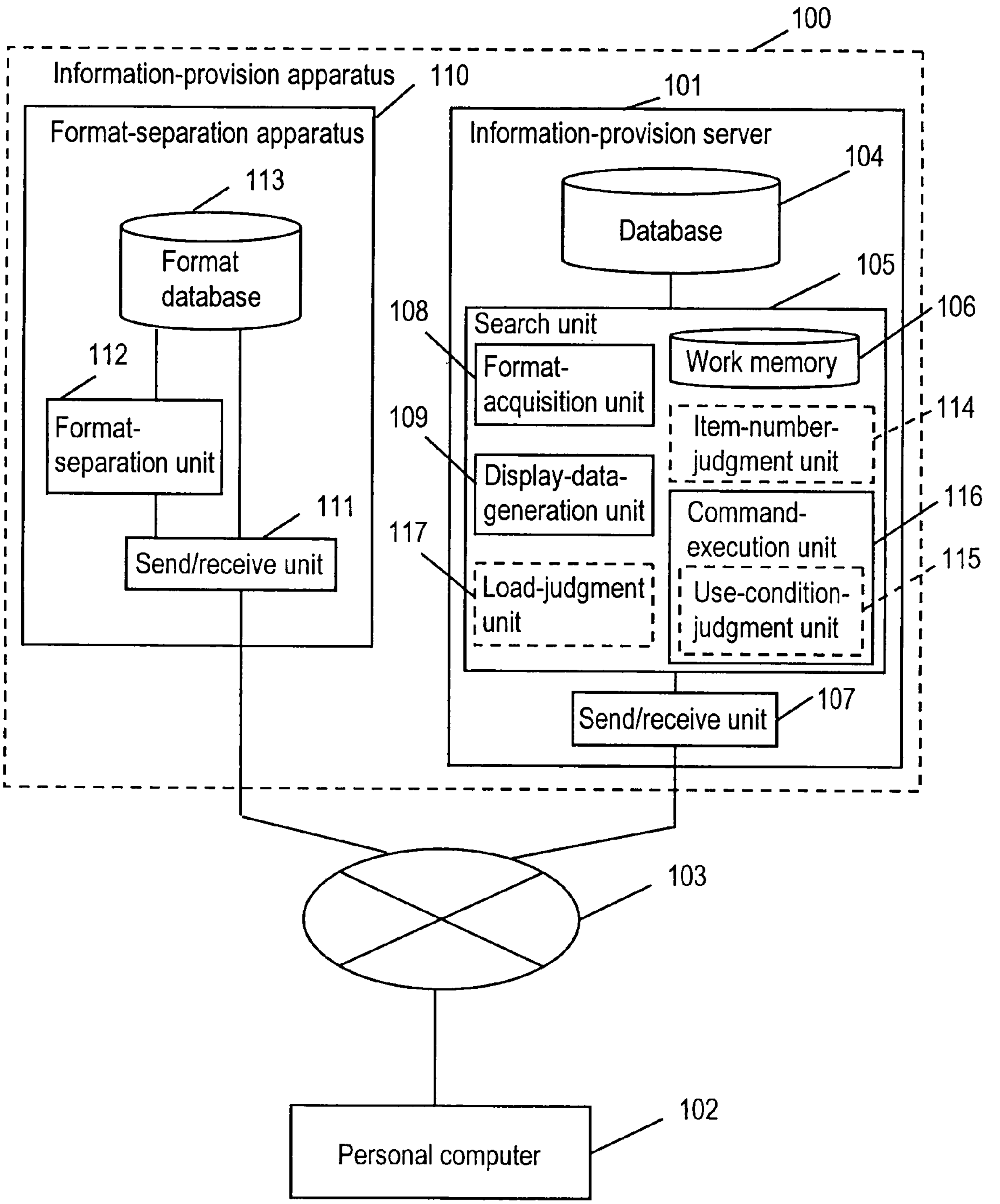
FIG. 1 is a function block diagram showing the information-provision apparatus of this invention comprising an information-provision server and format-separation apparatus.

FIG. 1 is a function block diagram of the case in which the information-provision apparatus 100 comprises an information-provision server 101 and a format-separation apparatus 110. In other words, the present invention can comprise an information-provision server 101 and a format-separation apparatus 110.

The information-provision server 101 and format-separation apparatus 110 are connected to a personal computer 102 via a network such as the Internet 103 such that communication is possible.

Figure 2:
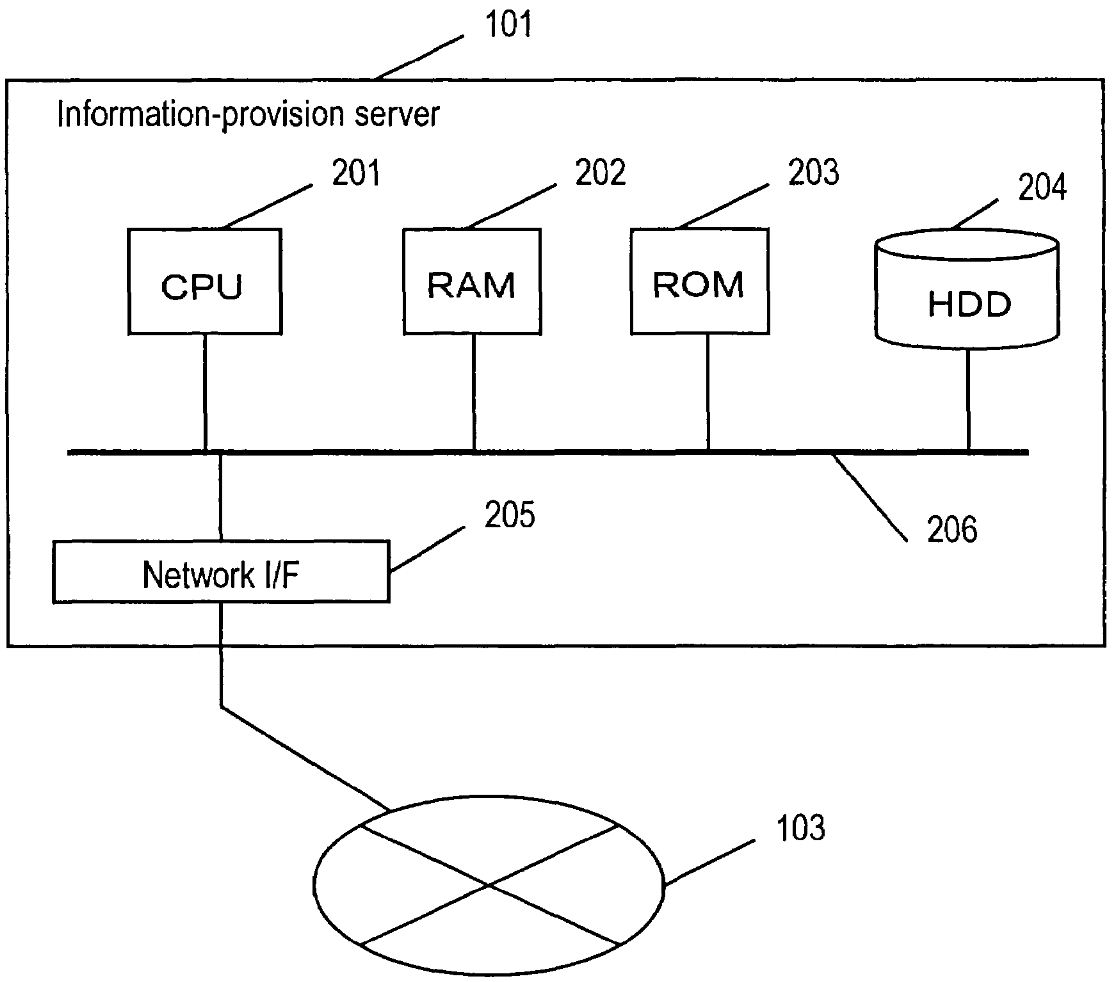
FIG. 2 is a drawing of the information-provision server and format-separation apparatus.

FIG. 2 is a drawing of the information-provision server 101 and format-separation apparatus 110, in which a CPU (Central Processing Unit) 201, RAM (Random Access Memory) 202, ROM (Read Only Memory) 203, HDD (Hard Disk Drive) 204 and network interface 205 are connected by way of an internal bus 206. The CPU 201 uses the RAM 202, for example, as a work area, and executes a program that is stored in the ROM 203 or HDD 204; and by writing data to or reading data from the format database 113 or database 104, it functions as the search unit 105 or format-separation unit 112 shown in FIG. 1. The network interface 205 is connected to the Internet 103 and makes it possible for an external terminal (personal computer 102 or the like) to send or receive data.

First, the processing by the format-separation apparatus 110 will be explained. As shown in FIG. 4, the format 401 that will be used in this embodiment is given in HTML that can be used by a conventionally used browser. With this format 401, the area of the variable (for example the variable 420) that is enclosed by '%%' can be read by the browser as is and displayed. There are limits to what can be displayed on the screen, and the contents in the format 401 are partially deleted, and when displayed by the browser, becomes as the display 601 shown in FIG. 6. In the display 601 shown in FIG. 6, the variable display 602 corresponds to the aforementioned variable 420.

The format 401 can be created on a personal computer 102, for example, using homepage creation software. However, in the format 401, for each specified structural unit, part information 402 to 411 is attached to the starting position and ending position of that structural unit. That part information 402 to 411 is given as a comment, so it has no effect on the display by the browser. Also, the starting position and ending position of the part information is determined by the order it appears starting from the beginning of the file, however, it can also be given as the starting position and ending position in a comment. Hereafter, format 401 to which part information is attached will be referred to as basic format data.

The basic format data mentioned above that is created by the personal computer 102 is sent by the user that registered the format to the format-separation unit 110 using FTP (File Transfer Protocol), HTTP (HyperText Transfer Protocol), etc. Here, for example, when there are no problems after the format-separation apparatus 110 verifies the user who transferred the basic format data, it receives that basic format data (FIG. 3; step S301).

Next, in the format-separation apparatus 110, after the send/receive unit 111 receives the basic format data, it sends that data to the format-separation unit 112. After the format-separation unit 112 receives the basic format data, first, it reads one line of data from the start of the file (FIG. 3; step S302). The data read first is the part information 402 shown in FIG. 4. Next, the format-separation unit 112 determines whether or not the read data is the start of the part information (FIG. 3; step S303).

Figure 3:
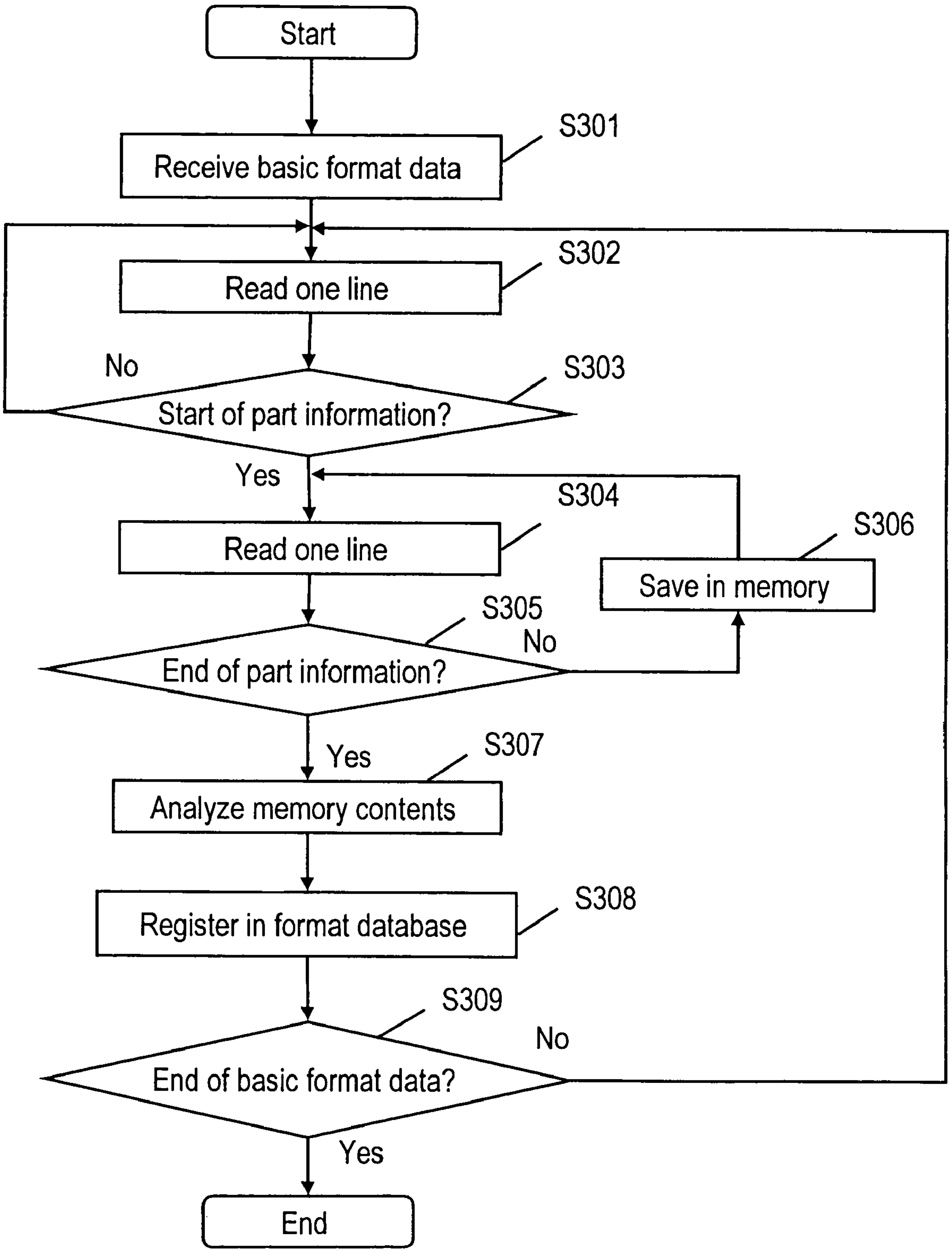
FIG. 3 is a flowchart showing the processing by the format-separation apparatus.

Here, the first line of data is the start of the part information, so the format-separation unit 112 reads one more line (FIG. 3; step S303: YES-->step S304). It further determines whether or not the read data is the end of the part information. In this case, the read data is not the end of the part information, so the read data is temporarily stored in memory (step S305: NO-->step S306). By repeating the process from step S304 to step S306, the text in the range 430 shown in FIG. 4 is stored in memory.

Next, the format-separation unit 112 reads one line that corresponds to the part information 403, and in process step S305 when it determines that the read line is the end of the part information, it analyzes the memory contents stored in process step S306 and stores the contents in the format database 113 (FIG. 3; step S305: YES-->step S307-->step S308).

The analysis process step S307 for analyzing the memory contents is as described below.

First, a 'No.' is set for the read basic format data such that the basic format data can be judged uniquely. Here, when the data is the first format read, the number '001', for example, is set. However, a name that is given by the user as an argument when sending the basic format data can also be set as the 'No.' described above, for example.

Next, the listed contents are determined as the start of the part information, and they are stored in 'id0' of the format database 113 (described later). Here, <!--Part: 1--> is given at the start of the part information, however, Part: 1, for example, is defined beforehand as 'no direct relation to the display contents'. The meaning of the contents given in the part information can be freely defined. Here, the contents are taken to be '1: No direct relation to the display contents', '2: Direct relation to the display, however, does not contain variables', '3: Direct relation to the display and contains variables'.

Furthermore, a number is attached to each structural unit of the basic format data as 'id1'. Here, '0' is attached because the unit is the first structural unit.

With the process above, the first structural unit of the basic format data is registered in the format database 113. FIG. 5 shows an image of the registration. In other words, '001' is stored for the item 'No.'; '1', which indicates that there is no direct relation with the display contents, is stored for the item 'id0', '0', which indicates the first structural unit, is stored for 'id1', and the text listed in the range 430 is stored for the item 'TEXT'.

After data has been registered in the format database, that data is judged as to whether or not it is the end of the basic format data file, and when it is not the end, the next line is read and the process is repeated, and as shown in FIG. 5, the format database 501 that corresponds to the format (basic format data) 401 is completed (FIG. 3: step S309: NO-->step S302).

When determining the end of the basic format data and it is determined that the file has ended, the format-separation unit 112 ends registration of the basic format data in the format database 113 (FIG. 3: step S309: YES-->End).

As described above, based on the part information that is attached to the basic format data, the format-separation unit separates, analyzes and registers the format, so by simply understanding the definition of the part information attached as comments, it is possible for a user who cannot understand the program to easily register the basic format data.

Next, the method of using the registered basic format data will be explained. First, the user who desires to search for some data uses a personal computer 102 and accesses the information-provision server 101 via the Internet 103. Of course, that personal computer 102 does not have to be the same personal computer that sent the basic format data to the format-separation apparatus 110.

When the personal computer 102 accesses the information-provision server 101, data for input used for entering the search conditions for the information search is sent to the personal computer 102. After the personal computer receives the data for input given in HTML, that data is displayed using the browser, and after entering the desired search conditions into specified locations, the user presses the 'Search' button. After the user presses the button, the search conditions entered by the user are sent to the search unit 105 by way of the send/receive unit 107.

After receiving the search conditions, the search unit 105 acquires data corresponding to the search conditions from the database 104. Acquisition of that data is performed as was performed conventionally, so details of the process are omitted here. The acquired data is temporarily stored together with the number of data in the work memory (FIG. 7; step S701-->step S702).

Figure 7:
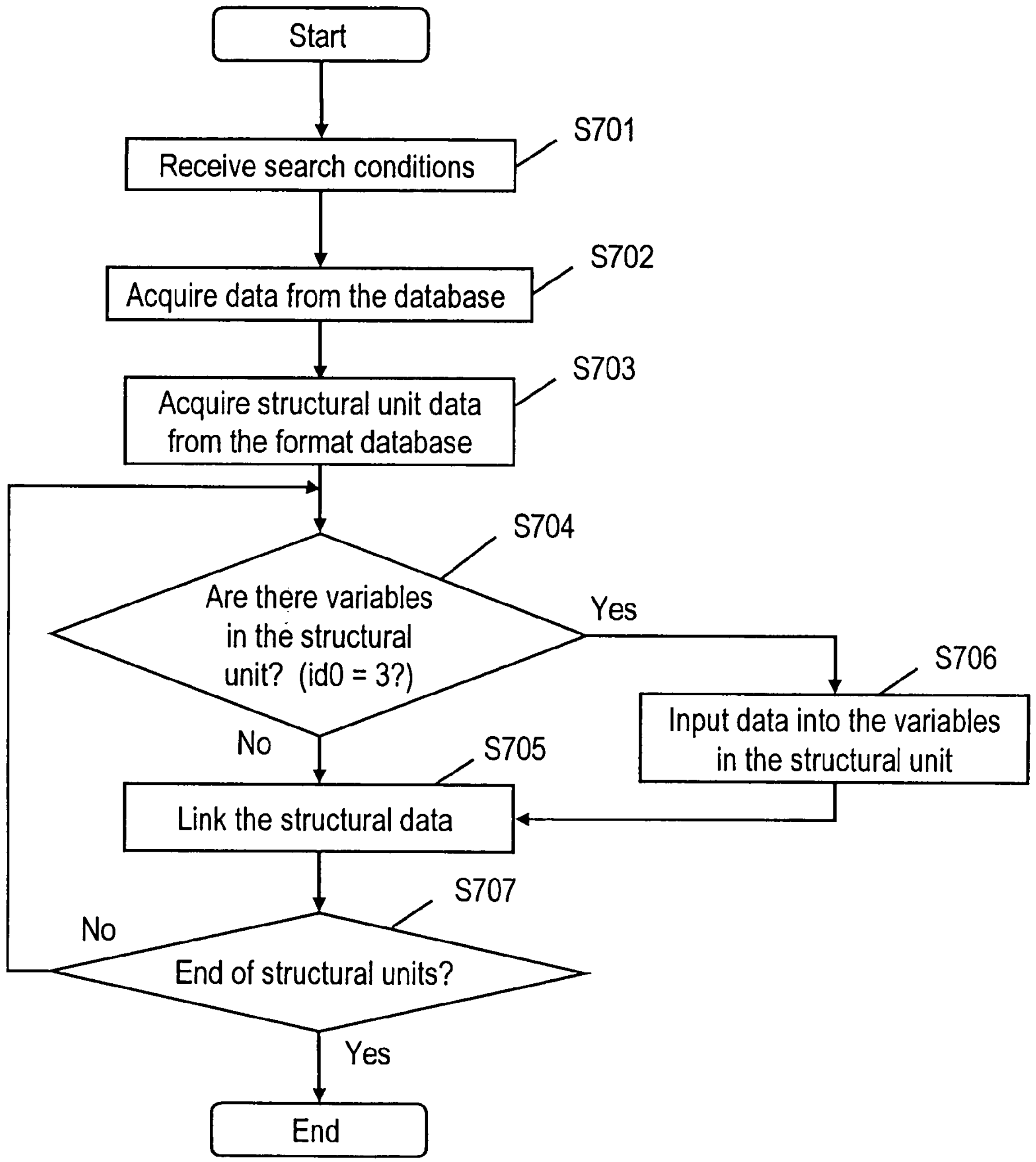
FIG. 7 is a flowchart showing the processing by the information-provision server.

Next, the format-acquisition unit 108 of the search unit 105 accesses the format database 113 via the Internet 103, and using the structural unit, for example 'No.', that is registered in the format database 113 as a key, acquires the format in ascending order based on 'id1' (FIG. 7; step S703). The method of acquisition is performed by using a SQL (Structured Query Language) message, for example, and acquiring the basic format data shown in FIG. 5 in structural units. Even in the case in which a plurality of basic format data is registered, by using 'No.' as a key, it is possible to acquire only a specified structural unit. During acquisition, the item 'id0' is also acquired.

Next, the display-data-generation unit 109 of the search unit 105 connects the data in the acquired order while judging 'id0'. Here, when the 'id0' item of the acquired data is not '3', there is no variable, so only 'TEXT' items are connected (FIG. 7; step S704: NO-->step S705).

When the 'id0' item of the acquired data is '3', a variable is contained in the 'TEXT' item, which is the structural unit, and using a specified process, the data acquired from the database 104 is entered into the corresponding variable (FIG. 7: step S706). 'TEXT' items, for which data has been entered for the variables, are connected in the same way (FIG. 7; step S706-->step S705).

As described above, the display-data-generation unit can determine the existence of variables into which data is to be entered by simply determining the type of structural unit, so it is not necessary to analyze whether or not there are any variables in the structural unit, and thus it is possible to very quickly end the data input process.

By repeating the connection of 'TEXT' items until the end of the structural units, an HTML file for which data has been input for the variables, or in other words, an HTML file for which variables have been input into the format 401 is generated (FIG. 7; step S707: YES-->End). Here, the aforementioned comment is not related to the display, so during connection of the data, the comments or part information can be deleted.

Inputting corresponding data for the variables can be easily performed using a conventional programming process, and even when a plurality of data is acquired by a search, the number of items of acquired data is also acquired, so the number of items can be processed by loop processing in the programming process.

The format 401, which is generated by processing of the display-data-generation unit 109 and in which data has been entered for the variables, is then sent to the personal computer 102 as display data. As a result, display data, which contains the data corresponding to the search conditions, is displayed by the browser that operates on the personal computer 102.

As described above, specified format is acquired from the format database, and as necessary, the display-data-generation unit enters data for the variables. Therefore, by setting correspondence between the variables and the data acquired from the database, the process contents, or in other words, the program of the display-data-generation unit does not have to be changed later.

Moreover, the program that generates the display data can be such that it simply connects the text and input data for the variables, so with its simple structure it can be applied to various formats without increasing the size of the program. In addition, since it is not necessary to change the program, it is possible to avoid unexpected problems in operation of the program, and as a result it is possible to improve the reliability of the system.

Furthermore, since it is possible for the format-separation apparatus to register the format, by simply being able to design the display data, it is possible for the user that provides data from the database to easily change the format without being aware of the program. In other words, it is possible for separate persons to perform design work and programming work at the same time, and thus it is possible to improve the work efficiency.

Furthermore, when the user has the authority to use the format-separation unit, it is possible for the user to easily register the format, so it is not necessary to have high-level authority as was needed in the past for changing the program, and thus as a result, the reliability of the system is improved.

In this embodiment of the invention, part information is always attached to the starting position and ending position of each structural unit, however, it is also possible to automatically store id0 as '1' in the format database for structural units to which part information is not attached, or to not store structural units to which part information is not attached or structural units defined by the part information as not needing to be stored.

Embodiment 2

Next, a second embodiment of the invention will be explained. In this second embodiment, an explanation of processes and construction that are the same as those of the first embodiment will be omitted.

Figure 8:
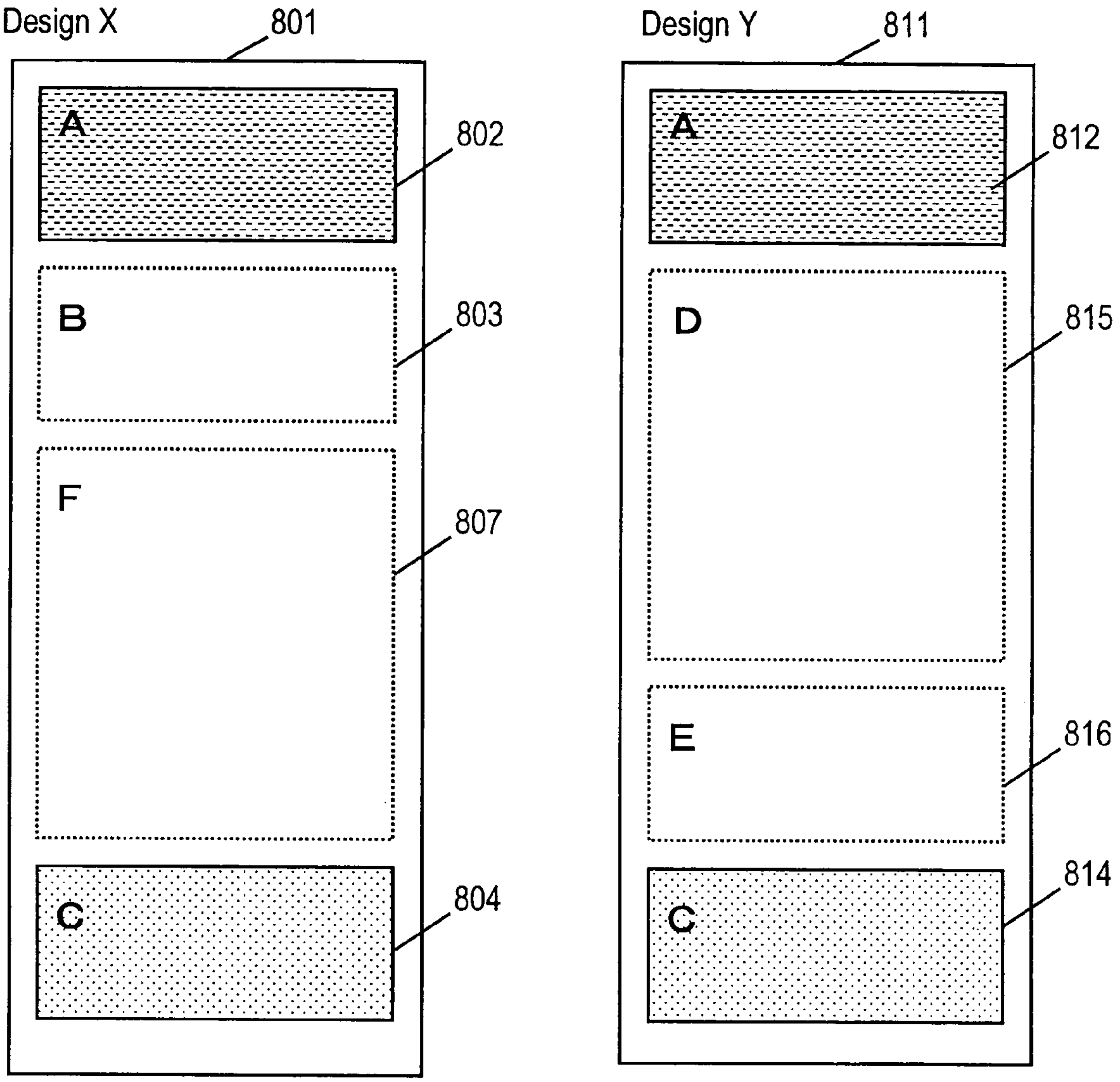
FIG. 8 is an image drawing showing a different design in a second embodiment of the invention.

FIG. 8 shows two HTML files 801, 811, and each has different structural units. However, structural unit A802 and structural unit A812 have the same contents (design), and furthermore, structural unit C804 and structural unit C814 also have the same contents. Structural unit B803, structural unit F807, structural unit D815 and structural unit E816 each have different contents. When providing HTML files 801, 811 having similar structure but overall different contents like this to the user, programs corresponding to the two designs were necessary in the past, however, with this second embodiment, it is possible to easily achieve these two designs.

Figure 9:
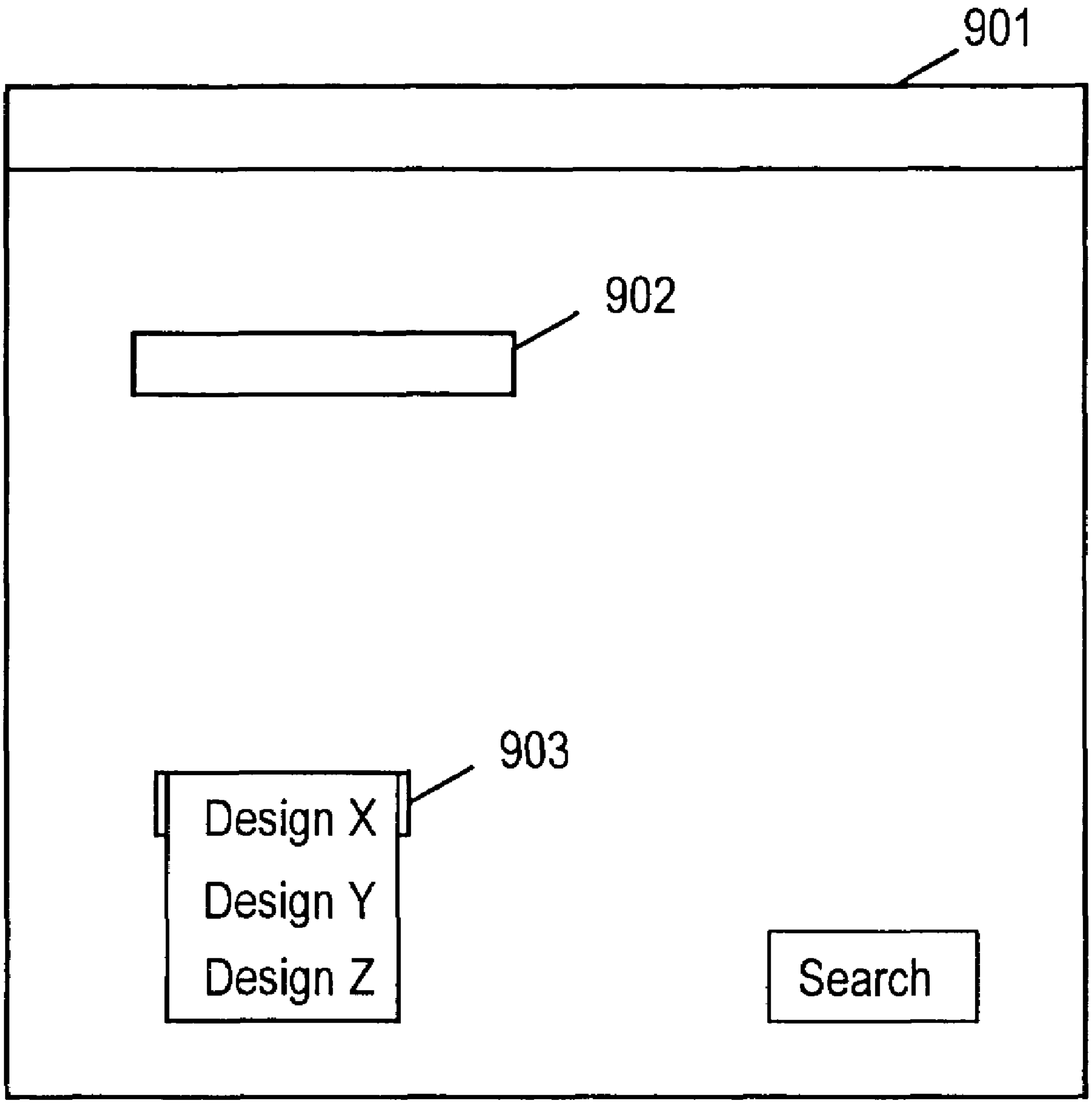
FIG. 9 is a drawing showing the data for input that allows the user to select the design.

First, after the personal computer 102 accesses the information-provision server 101, data for input, in which search conditions are input for searching information, is sent to the personal computer 102. Here, the data for input comprises a search-condition-input field 902 and a design-selection field 903 as in the data for input 901 shown in FIG. 9.

The user enters search conditions into the search-condition-input field 902 in the data for input, and further selects a desired design from the design-selection field 903, and presses the search button. After pressing the search button, in addition to the search conditions described in the first embodiment, the selected design information is also sent to the search unit 105. Here, supposing that design Y (HTML file 811) has been selected, the selection contents are sent as arguments such as 'A, D, E, C'.

The format-acquisition unit receives the design information, and when acquiring the structural units from the format database 113, acquires each of the structural units 'A, D, E, C' in this order based on the arguments. Of course, in the case where design X is selected, 'A, B, F, C' are obtained as arguments, so each of the structural units are acquired based on this.

After this, by performing the same processing as was described for the first embodiment, the display data for the design desired by the user is displayed on the personal computer 102.

As described above, the format-acquisition unit acquires each structural unit based on the design selected by the user, so it is possible to easily acquire the display data having different display contents. In this case, there is no need for a plurality of programs or complicated programs. In other words, by having a format-acquisition unit 108 and display-data-generation unit 109, it is possible to apply the invention to various formats.

Here, the structural units B803, F807, D815 and E816 are taken to have different contents, however, there is no problem even if the contents are the same, or whether the structural units contain or do not contain variables.

In the explanation above, the structural units 'A, D, E, C' were taken to be arguments, however, it is also possible to use the control numbers 'No.' of the basic format data of 'design Y' as arguments, and to send them to the search unit to directly select design Y.

Moreover, the embodiment described above is a case in which the user intentionally selects the format, however, it is possible for the format-acquisition unit to set the structural units or design type to acquire based on information obtained through communication with the personal computer. The information obtained through communication can be information such as the IP (Internet Protocol) address, MAC (Media Access Control) address, and information managed by the browser of the access source (the personal computer 102 in this case).

For example, this is a process in which when personal computers at company A use IP addresses in a specified range, design X is applied for access by the personal computers corresponding to that IP address range, and design Y is applied to any other access. In this case as well, it is possible to use common format in places where it is not necessary to make changes.

Also, in the case of provided information (data) necessary for user verification, it is possible to set the structural unit to be acquired based on that user verification information.

Moreover, the information managed by the browser can include for example, the browser type and version, and information that the browser is able to send to the information-provision apparatus. As an example of using information managed by the browser is a process that determines the browser type when there is access from the browser of a portable-information terminal such as a portable telephone, and applies design Z for that portable terminal. In this case, it is possible to easily provide a special design for portable terminals that have particularly small display screens, so the effect of applying the invention can be said to be high.

In the embodiment described above, it is possible to dynamically and easily change the design of the display data without any instruction from the user. This is especially effective in the case where a format database is used by a plurality of users (subscribers).

It is also possible to select the design at random.

Embodiment 3

Next, a third embodiment of the invention will be explained. In this third embodiment, explanations of processes and construction that are the same as those of the first or second embodiments described above will be omitted.

In this embodiment, the search unit 105 further comprises an item-number-judgment unit 114.

In the first embodiment, the points of the search unit 105 that received the search conditions acquiring data corresponding to those search conditions from a database 104, and temporarily storing the acquired data in the work memory 106 together with the number of the data were explained (FIG. 7; step S701-->step S702).

Here, in this embodiment, the item-number-judgment unit 114 acquires the number of acquired data.

Next, the item-number-judgment unit 114 that acquired the number determines the number of data. More specifically, it determines whether the number of data is greater than 1 and less then a specified number of data, or is greater than the specified number. In the explanation below, the specified number of data will be taken to be four.

Figure 10A:
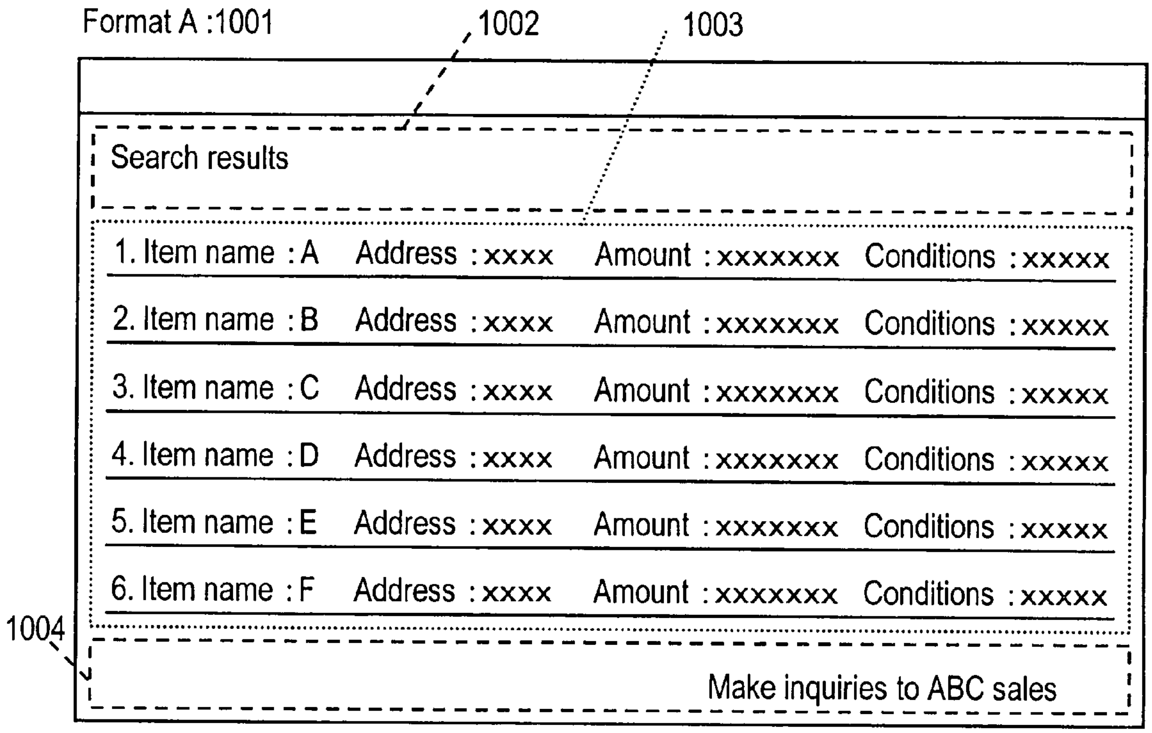
FIGS. 10A and 10B are drawings showing examples of when the display is changed according to differences in the number of data items.
Figure 10B:
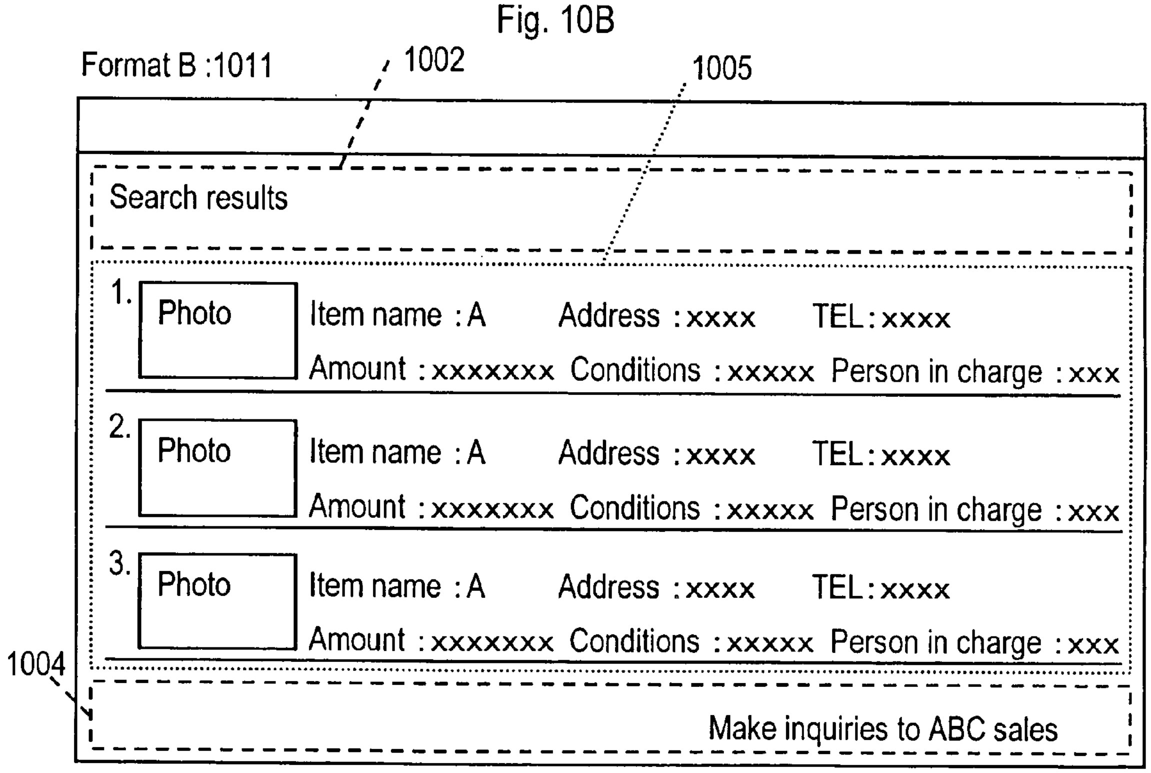
Figure 12:
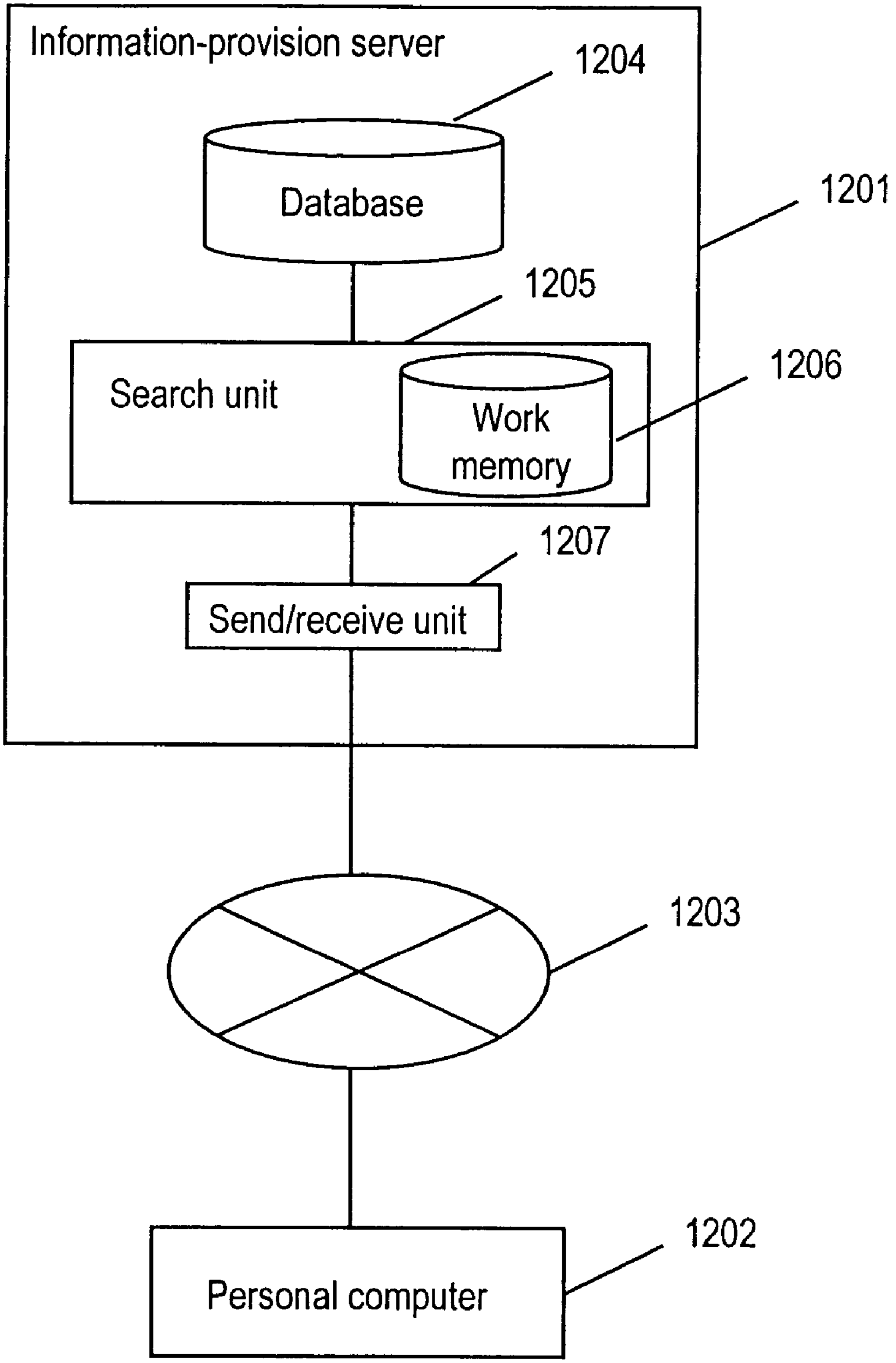
FIG. 12 is a function block diagram of the information-provision apparatus that uses a conventional database.
Figure 14:
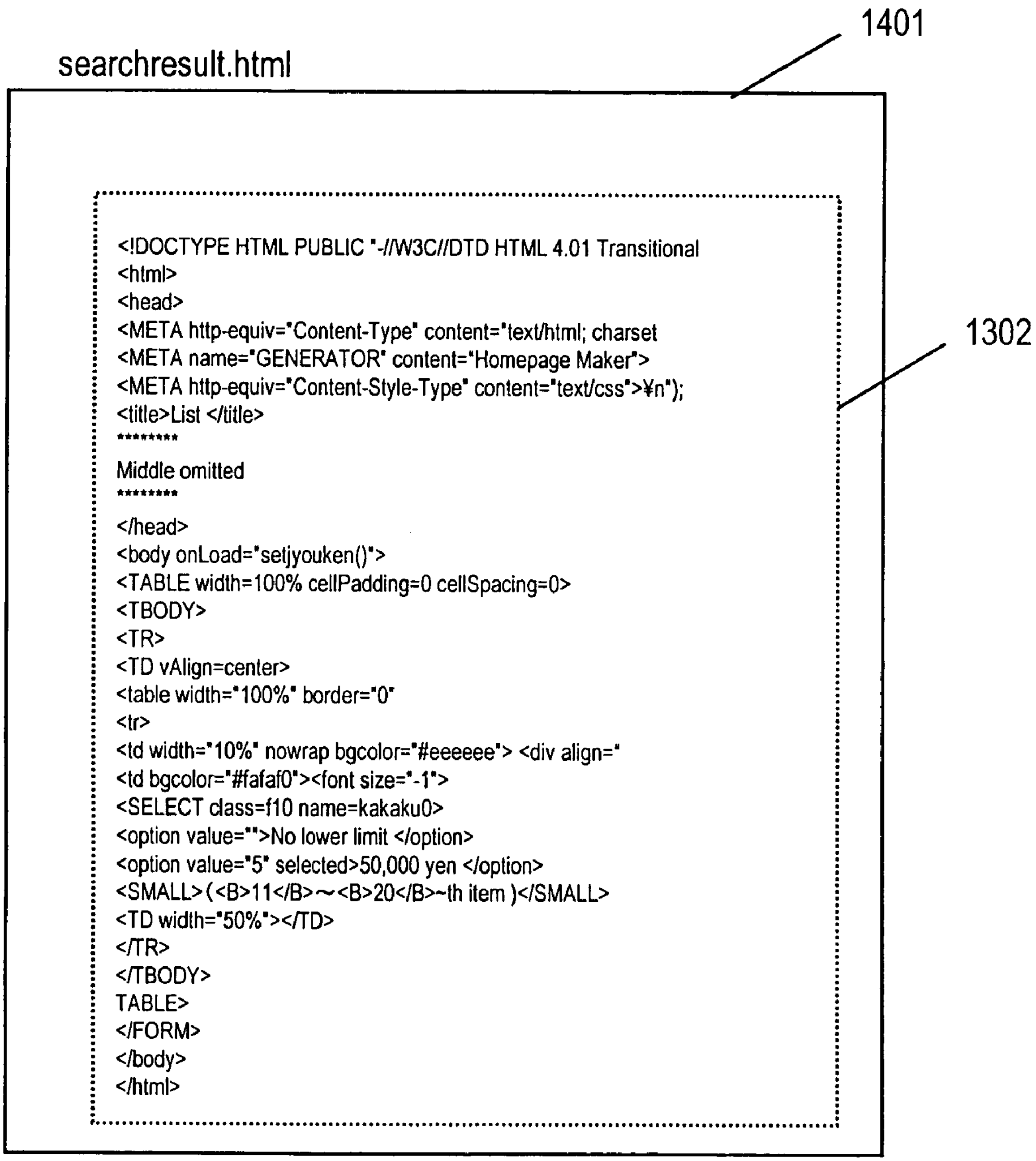
FIG. 14 is an example of display data that was created by a conventional program.

FIG. 10 shows format A1001 and format B1011. In the two formats, the structural units 1002 that display the 'search results', and the structural units 1004, 'make inquiries to ABC sales' are the same, and are displayed regardless of the number of data.

Here, in the case where the number of data is six, the item-number-judgment unit 114 notifies the format-acquisition unit 108 to select structural unit 1003 that indicates the summary display.

After receiving the notification, the format-acquisition unit 108 acquires the structural unit 1003 from the format database 113 according to the notification. Also, the display-data-generation unit 109 generates display data by inputting corresponding data for the variables of structural unit 1003.

Also, in the case where the number of data is three, the item-number-judgment unit 114 notifies the format-acquisition unit 108 to select structural unit 1005 that indicates the detail display.

After receiving that notification, the format-acquisition unit 108 acquires structural unit 1005 from the format database 113 according to that notification. Also, the display-data-generation unit 109 generates display data by inputting corresponding data for the variables of structural unit 1005.

Regardless of the number of data, both structural unit 1002 and structural unit 1004 are acquired.

By dynamically changing the structural units to be acquired based on the number of data acquired as described above, it is possible to provide the user with an easy-to-view display as needed according to the number of data. Also, with this invention, it is possible to register a format for each structural unit, so even in the case of using a plurality of formats, it is not necessary to prepare the display-generation unit, or in other words, a program for each format. That is, it is possible to easily change the format.

Here, instead of, or in addition to the item-number-judgment unit, the invention may comprise a load-judgment unit 117. The load-judgment unit 117 determines the load on the CPU 201 and/or network 103. Determining the load on the network 103 referred to here is performed by determining the amount of data received or the amount of packets detected by the network I/F 205.

The load-judgment unit 117 determines whether or not the load exceeds a specified threshold value. Here, when the load is greater than a specified threshold value, structural unit 1003 that indicates the summary display (low-load format) is selected, and when the load is less than a threshold value, structural unit 1005 that indicates a detailed display (high-load format) is selected. The high-load format referred to here is a structural unit explained in this disclosure, and it contains image data or it has a large amount of information, so it is a format that applies a load on the information-provision server (CPU) or network, and the low-load format referred to here is the display of just an item, for example, and is a format that does not apply a load.

By dynamically changing the format according to the load on the CPU or network as described above, it is possible to avoid the use of a high-load format and to prevent a drop in system performance. Of course, since a low-load format and high-load format are separated, the user does not have a problem in not being able to obtain search results, as in the case of the ‘System Busy’ display in the past.

Embodiment 4

Next, a fourth embodiment of the invention will be explained. In this fourth embodiment, an explanation of processes and construction that are the same as those in the first, second or third embodiments will be omitted.

As one embodiment of the invention, the case of a plurality of businesses using the same information-provision server can be considered. Also, there is the case where in the same business it may be desired to restrict the use of structural units that can be used by each department or each user. In this kind of case, when performing restrictions in units of basic format data, the use of structural units that can be shared also becomes restricted, so as a result, it becomes necessary to have a plurality of the same structural units. Moreover, by notifying the system manager of the information-provision server, in a system in which whether or not each structural unit can be used or not is registered, a problem exists in that management cost increases, and basic format data cannot be easily registered. In order to solve this kind of problem, in this embodiment, the search unit 105 further comprises a use-condition-judgment unit 115.

The setting for performing use restrictions, and the processing by the use-condition-judgment unit 115 will be explained below.

First, a user that registers format sends basic format data, in which a specified command is inserted in the part information, to the format-separation unit 112, and basic format data is registered for each structural unit. FIG. 11 shows an example of when the part information of the basic format data is registered in the format database. Here, ‘#ALLOW=YAMADA, 192.168.24.36, 00-99-26-69-5B-A4#’ is listed in the part information 1103 in structural element 1102 of the format database 1101. This listing restricts the users that are allowed to use that structural unit, and here only the user ‘YAMADA’, or the personal computer (information terminal) having the IP address ‘192.168.24.36’, or the personal computer having the MAC address ‘00-99-26-69-5B-A4’ are allowed use. Here, ‘ALLOW’ is the command that restricts the user of the structural units. Hereafter, the restriction listing is called condition information. The user in the condition information is the verified user described in the first embodiment, and the IP address or MAC address is the address of the personal computer that performs the current access.

After the format-acquisition unit 108 acquires the registered structural units as described above, the use-condition-judgment unit 115 reads the condition information. Next, the use-condition-judgment unit 115 acquires the verified user of the currently accessing personal computer 102, and the IP address and MAC address of that personal computer 102 and determines whether or not they match the condition information.

When they match, it determines that the user is allowed to use the structural unit and notifies the display-data-generation unit 109 of that fact. The display-data-generation unit 109 receives that notification and uses that structural unit to generate display data.

When they do not match, the use-condition-judgment unit 115 determines that the user is not allowed to use the structural unit and notifies the display-data-generation unit 109 of that fact. The display-data-generation unit 109 receives that notification and does not display the display data or generates display data with that structural unit deleted.

By having the use-condition-judgment unit judge condition information for each structural unit as described above, it becomes possible to restrict use for each structural unit. As a result, it is possible to maintain necessary security and to keep registration of structural units to a minimum. Also, since it is possible to restrict use by simply listing restrictions in the basic format data, it is possible for a user that registers format to easily restrict use of structural units without having to perform processing such as application and registration.

Here, restricting use was performed by using the ‘ALLOW=’ command, however, it is also possible to use other commands (for example, DENY) that lists users for which use is not allowed. Also, when it is not necessary to restrict usage, it is possible to insert another command into the part information, and for a command-execution unit 116 to execute the process corresponding to that command. In other words, the use-condition-judgment unit is an example of the command-execution unit.

As an example of such a command, '#INCLUDE=001:3:3#' may be listed in the part information 1105 of the structural unit 1104 as shown in FIG. 11. By doing so, the command-execution unit 116 can insert a structural unit having 'No.'=001, 'id0'=3 and 'id1'=3 into the location of that structural unit, or in other words, can insert the structural unit 502 shown in FIG. 5 into the location where that command is listed.

By having the command-execution unit execute commands inserted with specified structural units as described above, it becomes possible for the user that is registering a format to easily use structural units that are already registered.

The command also includes a control variable for controlling the operation of the search unit and display-data-generation unit (this variable is not a variable for inputting data acquired from the database). In other words, by listing '#default-value=6:7:8:9#' as the command, the use of inputting '6:7:8:9' in the control variable 'default-value' used be each unit is also possible.

By doing so, it becomes possible for a user that registers format to control the program without changing the program, and thus it is possible to improve convenience.

The embodiments 1 to 4 described above can also be used in combination.

INDUSTRIAL APPLICABILITY

With the information-provision apparatus of this invention, by using a format database to acquire a specified format, there is no need to change the processing contents performed by the display-data-generation unit for each format, so it can be used to reference a database according to a request from an information terminal, and to return data corresponding to that request to the information terminal.

I claim:

1. An information-provision apparatus that acquires data from a database according to a request from an information terminal, correlates said data with a template described in a specific Markup language to create display data, and then sends said display data to said information terminal, comprising:

a processor or central processor unit (CPU) coupled to a storage medium containing the database and to the information terminal to execute tasks for the information-provision apparatus;

a basic format data that is a format including structural units, each of the structural units corresponding to a type displaying the structural unit or a type including a command, and the structural units being attached by an operator with part information at both a starting position and an ending position of the structural unit, the part information being a comment including an identifier indicating (a) a description not directly related to display, (b) a description directly related to display and containing no variable, (c) a description directly related to display and containing variables, or (d) a description containing a command;

a format-separation unit that separates said basic format data into the structural units based on the part information;

a format-memory unit that stores respective structural units separated by said format-separation unit;

a format-acquisition unit that acquires the structural units from said format-memory unit that correspond to the request from the information terminal;

a command-execution unit that executes the command contained in the structural unit when the identifier of the structural unit acquired by said format-acquisition unit indicates that the structural unit includes the command; and a display-data-generation unit that generates the display data by sequentially combining the structural units acquired by the format acquisition unit when the identifier included in the part information of the structural unit acquired by the format-acquisition unit indicates the structural unit which is the description directly related to display and containing variables, acquiring the correlated data from a data-memory unit and inserting said data into a specific field.

2. The information-provision apparatus of claim 1 further comprising:

an item-number-judgment unit that determines a number of items in the data acquired from the database according to the request from said information terminal and selects the structural units to use based on the number of items; and wherein said format-acquisition unit acquires the structural units selected by said item-number-judgment unit.

3. The information-provision apparatus of claim 2, wherein when the number of the items in said acquired data is greater than one and less than a specified number, said item-number-judgment unit selects the structural unit that is different from the structural unit when the number of the items in said acquired data is greater than the specified number.

4. The information-provision apparatus of claim 1 further comprising:

a load-judgment unit that determines a load on the CPU of said information-provision apparatus, and selects structural units used based on the load, and wherein said format-acquisition acquires the structural units that are set by said load-judgment unit.

5. The information-provision apparatus of claim 1 further comprising:

a load-judgment unit that determines a load on a network to which said information-provision apparatus is connected, and selects the structural units used based on the load, and wherein said format-acquisition acquires the structural units that are set by said load-judgment unit.

6. The information-provision apparatus of claim 1 further comprising:

a sending unit that sends data for input to the information terminal for selecting said structural units and display order of said structural units that are separated by said format-separation unit, wherein said format-acquisition unit acquires the structural units from said format-memory unit based on results of selections that were input into the data for input.

7. The information-provision apparatus of claim 1 wherein said format-acquisition unit selectively acquires the structural units based on information obtained through communication with said information terminal.

8. The information-provision apparatus of claim 1 that selectively acquires the structural units based on verification information for a user using said information terminal.

9. The information-provision apparatus of claim 1 further comprising:

a use-condition-judgment unit that determines use of the structural unit based on condition information and information related to said information terminal, or based on the condition information and information about a user using said information terminal, if said command is a command that restricts conditions when using said structural units and contains said condition information which are the restricted conditions, and wherein said display-data-generation unit generates display data based on judgment results from said use-condition-judgment unit.

10. The information-provision apparatus of claim 1, wherein if said command is an instruction to insert another structural unit when using the structural unit, said command-execution unit acquires another structural unit from said format-memory unit based on said instruction, and inserts that another structural unit in a specified location.

11. An information-provision method that is carried out by instructions from a computer, of acquiring data from a database according to a request from an information terminal, correlating said data with a template described in a specific Markup language to create display data, and then sending said display data to said information terminal, comprising:

a basic format data that is a format including structural units, each of the structural units corresponding to a type of displaying the structural unit or a type including a command, and the structural units being attached by an operator with part information at both a starting position and an ending position of the structural unit, the part information being a comment including an identifier indicating (a) a description not directly related to display, (b) a description directly related to display and containing no variable, (c) a description directly related to display and containing variables, or (d) a description containing a command;

a format-separation unit that separates said basic format data into the structural units based on the part information;

a format-memory unit that stores respective structural units separated by said format-separation unit;

a format-acquisition unit that acquires the structural units from said format-memory unit that correspond to the request from the information terminal;

a command-execution unit that executes the command contained in the structural unit when the identifier of the structural unit acquired by said format-acquisition unit indicates that the structural unit includes the command; and a display-data-generation unit that generates the display data by sequentially combining the structural units acquired by the format acquisition unit when the identifier included in the part information of the structural unit acquired by the format-acquisition unit indicates the structural unit which is the description directly related to display and containing variables, acquiring the correlated data from a data-memory unit and inserting said data into a specific field.

12. An information provision system that acquires data from a database according to a request from an information terminal, correlates said data with a template described in a specific Markup language to create display data, and then sends said display data to said information terminal, comprising:

a processor coupled to a storage medium containing the database and to the information terminal to execute tasks for the information-provision apparatus; and a format-separation apparatus comprising:

a basic format data that is a format including structural units, each of the structural units corresponding to a type displaying the structural unit or a type including a command, and the structural units being attached by an operator with part information at both a starting position and an ending position of the structural unit, the part information being a comment including an identifier indicating (a) a description not directly related to display, (b) a description directly related to display and containing no variable, (c) a description directly related to display and containing variables, or (d) a description containing a command;

a format-separation unit that separates said basic format data into the structural units based on the part information;

a format-memory unit that stores respective structural units separated by said format-separation unit;

a format-acquisition unit that acquires the structural units from said format-memory unit that correspond to the request from the information terminal;

a command-execution unit that executes the command contained in the structural unit when the identifier of the structural unit acquired by said format-acquisition unit indicates that the structural unit includes the command; and a display-data-generation unit that generates the display data by sequentially combining the structural units acquired by the format acquisition unit when the identifier included in the part information of the structural unit acquired by the format-acquisition unit indicates the structural unit which is the description directly related to display and containing variables, acquiring the correlated data from a data-memory unit and inserting said data into a specific field.

* * * * *

UNITED STATES PATENT AND TRADEMARK OFFICE

CERTIFICATE OF CORRECTION

PATENT NO. : 7,647,301 B2
APPLICATION NO. : 10/902857
DATED : January 12, 2010
INVENTOR(S) : Takashi Nakano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this

Sixteenth Day of November, 2010

David J. Kappos

*Director of the United States Patent and Trademark Office*